United States Patent
Xu

(10) Patent No.: US 12,531,787 B2
(45) Date of Patent: Jan. 20, 2026

(54) MODEL MANAGEMENT METHOD AND COMMUNICATION DEVICE

(71) Applicant: GUANGDONG OPPO MOBILE TELECOMMUNICATIONS CORP., LTD., Dongguan (CN)

(72) Inventor: Yang Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 9 days.

(21) Appl. No.: 18/544,116

(22) Filed: Dec. 18, 2023

(65) Prior Publication Data

US 2024/0121163 A1   Apr. 11, 2024

Related U.S. Application Data

(63) Continuation of application No. PCT/CN2021/102561, filed on Jun. 25, 2021.

(51) Int. Cl.
*H04L 41/14* (2022.01)
*H04L 41/16* (2022.01)

(52) U.S. Cl.
CPC .......... *H04L 41/145* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 9,443,202 B2 | 9/2016 | Leppanen | |
| 11,895,034 B1* | 2/2024 | Yoskowitz | H04L 63/102 |
| 2013/0238535 A1 | 9/2013 | Leppanen | |
| 2022/0091837 A1* | 3/2022 | Chai | G06F 8/36 |
| 2022/0197953 A1* | 6/2022 | Yuan | H04L 41/16 |
| 2022/0353803 A1* | 11/2022 | Wang | G06N 3/09 |

FOREIGN PATENT DOCUMENTS

| | | |
|---|---|---|
| CN | 108734293 A | 11/2018 |
| CN | 110569288 A | 12/2019 |
| CN | 111796925 A | 10/2020 |
| WO | 2019216938 A1 | 11/2019 |

(Continued)

OTHER PUBLICATIONS

3GPP. "Study on traffic characteristics and performance requirements for AI/ML model transfer in 5GS (Release 18)" TR 22.874 V0.2.0 (Nov. 2020), Nov. 30, 2020 (Nov. 30, 2020), pp. 34-37. 65 pages.

(Continued)

*Primary Examiner* — Fadi Haj Said
(74) *Attorney, Agent, or Firm* — BAYES PLLC

(57) ABSTRACT

A model management method and a communication device are provided. The method includes that: a node obtains a model management service provided by a model management module, the model management service supports the node to perform at least one of the following operations: storing one or more models to the model management module; updating one or more models in the model management module; and obtaining one or more models from the model management module.

7 Claims, 9 Drawing Sheets

(56) References Cited

FOREIGN PATENT DOCUMENTS

WO 2020211722 A1 10/2020

OTHER PUBLICATIONS

International Search Report in the international application No. PCT/CN2021/102561, mailed on Mar. 7, 2022. 5 pages with English translation.
Written Opinion of the International Search Authority in the international application No. PCT/CN2021/102561, mailed on Mar. 7, 2022. 9 pages with English translation.
China Telecom et al: "FS_AMMT update to AI model management as a Service UC", 3GPP Draft; S1-210031R6, 3rd Generation Partnership Project (3GPP), Mobilecompetence Centre ; 650, Route Des Lucioles ; F-06921 Sophia-Antipolis Cedex; France vol. SA WG1, No. Electronic Meeting; Feb. 22, 2021-Mar. 4, 2021 Mar. 15, 2021 (Mar. 15, 2021), XP051986665, p. 2, section "AI model management as a Service", figure 1.
"3rd Generation Partnership Project; Technical Specification Group Services and System Aspects; study on traffic characteristics and performance requirements for AI/ML model transfer in 5GS (Release 18)", 3GPP Standard; Technical Report; 3GPP TR22.874, 3rd Generation Partnership Project (3GPP), Mobile Competence Centre; 650, Route Des Lucioles; France No. V18.0.1, Jun. 24, 2021 (Jun. 24, 2021), pp. 1-111, XP052029572, p. 35, section "6.4 Al model management as a Service", figure 6.4.1-1.
OPPO CMCC China Telecom China Unicom: "Discussion on AI/ML Model Transfer in 5GS", 3GPP Draft; S1-193039, 3rd Generation Partnership Project (3GPP), Mobilecompetence Centre; 650, Route Des Lucioles; F-06921 Sophia-Antipolis Cedex; France vol. SA WG1, No. Reno, USA; Nov. 18, 2019Nov. 22, 2019, Nov. 8, 2019 (Nov. 8, 2019), XP051822342, the whole document, 13 pages.
Partial Supplementary European Search Report in the European application No. 21946556.4, mailed on Jun. 18, 2024, 16 pages.
Supplementary European Search Report in the European application No. 21946556.4, mailed on Sep. 11, 2024, 14 pages.

\* cited by examiner

| A model management module provides a model management service for a node, and the node acquires the model management service provided by the model management module, where the model management service supports the node to perform at least one of: storing one or more models to the model management module; updating one or more models in the model management module; or acquiring one or more models from the model management module | 401 |

FIG. 4

MODEL MANAGEMENT METHOD AND COMMUNICATION DEVICE

CROSS-REFERENCE TO RELATED APPLICATION

This is a continuation application of International Application No. PCT/CN2021/102561, filed on Jun. 25, 2021, the content of which is hereby incorporated by reference in its entirety.

BACKGROUND

It is an important direction of the network development in the future that the Artificial Intelligence (AI) technology empowers specific functions. Therefore, it is necessary to use corresponding AI models to achieve the purpose of empowering the specific functions.

On the one hand, different functions need to use different AI models; on the other hand, the AI models vary with different conditions, which will lead to a requirement for network architecture to support massive AI models. How to manage the massive AI models needs to be improved.

SUMMARY

Embodiments of the present disclosure relate to the technical field of mobile communication, and in particular to methods for a model management and communication devices.

Embodiments of the present disclosure provide a method for a model management, a communication device, a chip, a computer-readable storage medium, a computer program product and a computer program.

The communication device provided by the embodiment of the present disclosure includes a processor.

The processor is configured to acquire a model management service provided by a model management module, where the model management service supports the node to perform at least one of following operations:
  storing one or more models to the model management module;
  updating one or more models in the model management module; or
  acquiring one or more models from the model management module.

The communication device provided by the embodiments of the present disclosure includes a processor.

The processor is configured to provide a model management service for a node, where the model management service supports the node to perform at least one of following operations:
  storing one or more models to the model management module;
  updating one or more models in the model management module; or
  acquiring one or more models from the model management module.

The communication device provided by the embodiments of the present disclosure includes a processor The processor is configured to acquire a model information context of a terminal.

The processor is further configured to determine a model supported by the terminal based on the model information context; and apply the model to a control plane function or a user plane function corresponding to the terminal.

BRIEF DESCRIPTION OF THE DRAWINGS

The drawings described herein are adopted to provide a further understanding to the present disclosure and form a part of the present disclosure. Schematic embodiments of the present disclosure and descriptions thereof are adopted to explain the present disclosure and not intended to form improper limits to the present disclosure. In the drawings:

FIG. 4 is a first flowchart of a method for a model management according to an embodiment of the present disclosure;

DETAILED DESCRIPTION

The technical schemes of the embodiments of the present disclosure will be described below in combination with the drawings in the embodiments of the present disclosure. It is apparent that the described embodiments are not all embodiments but a part of embodiments of the present disclosure. All other embodiments obtained by those of ordinary skill in the art based on the embodiments in the present disclosure without creative work shall fall within the scope of protection of the present disclosure.

Figure 1:
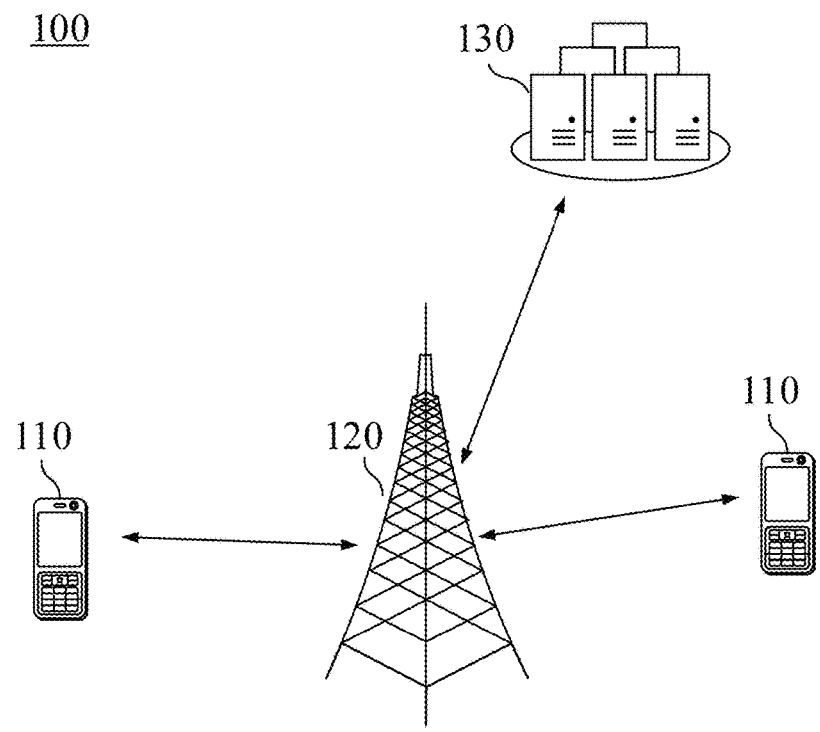
FIG. 1 is a schematic diagram of an application scenario to which an embodiment of the present disclosure is applied.

FIG. 1 is a schematic diagram of an application scenario to which an embodiment of the present disclosure is applied.

As shown in FIG. 1, the communication system 100 may include a terminal device 110 and a network device 120. The network device 120 may communicate with the terminal device 110 through an air interface. The multi-service transmission is supported between the terminal device 110 and the network device 120.

It should be understood that the embodiments of the present disclosure are illustrative only with the communication system 100 but are not limited thereto. That is to say, the technical schemes of the embodiments of the present disclosure may be applied to various communication systems, for example, a Long Term Evolution (LTE) system, a LTE Time Division Duplex (TDD), an Universal Mobile Telecommunication System (UMTS), an Internet of Things (IoT) system, a Narrow Band Internet of Things (NB-IoT) system, an enhanced Machine-Type Communications (eMTC) system, a 5G communication system (also called as a New Radio (NR) communication system), or a future communication system.

In the communication system 100 shown in FIG. 1, the network device 120 may be an access network device that communicates with the terminal device 110. The access network device may provide communication coverage for a specific geographic area and may communicate with the terminal device 110 (e.g. User Equipment (UE)) located within the coverage.

The network device 120 may be an Evolutional Node B (eNB or eNodeB) in the LTE system, a Next Generation Radio Access Network (NGRAN) device, a base station (gNB) in an NR system, or a wireless controller in a Cloud Radio Access Network (CRAN). Or, the network device 120 may be a relay station, an access point, a vehicle device, a wearable device, a hub, a handover, a network bridge, a router, a network device in a future evolved Public Land Mobile Network (PLMN), etc.

The terminal device 110 may be any terminal device including, but not limited to, a terminal device in wired or wireless connection with the network device 120 or other terminal devices.

For example, the terminal device 110 may be an access terminal, UE, a user unit, a user station, a mobile station, a mobile radio station, a remote station, a remote terminal device, a mobile device, a user terminal, a terminal, a wireless communication device, a user agent or a user device. The access terminal may be a cell phone, a cordless phone, a Session Initiation Protocol (SIP) phone, an IoT device, a satellite handheld terminal, a Wireless Local Loop (WLL) station, a Personal Digital Assistant (PDA), a handheld device with a wireless communication function, a computing device, another processing device connected to a wireless modem, a vehicle device, a wearable device, a terminal device in the 5G network, a terminal device in the future evolved PLMN or the like.

The terminal device 110 may be used for a Device to Device (D2D) communication.

The wireless communication system 100 may also include a core network device 130 that communicates with the base station. The core network device 130 may be a 5G core (5GC) device, for example, an access and mobility management function (AMF), for another example, an authentication server function (AUSF), for another example, a User Plane Function (UPF), and for another example, a Session Management Function (SMF). Optionally, the core network device 130 may also be an Evolved Packet Core (EPC) device of the LTE network, for example, a session management function+core packet gateway (SMF+PGW-C) device. It should be understood that SMF+PGW-C can implement the functions implemented by the SMF and PGW-C. In a process of network evolution, the core network device may also be called by other names, or a new network entity may be formed by partitioning the functions of the core network, which is not limited in the embodiments of the present disclosure.

The communication between the functional units of the communication system 100 may be implemented by establishing a connection through a next generation (NG) interface.

For example, the terminal device sets up the air interface connection with the access network device through an NR interface, to transmit user plane data and control plane signaling. The terminal device may set up a control plane signaling connection with an AMF through an NG interface 1 (abbreviated as N1). The access network device, such as the gNB, may set up a user plane data connection with a UPF through an NG interface 3 (abbreviated as N3). The access network device may set up control plane signaling connection with the AMF through a NG interface 2 (abbreviated as N2). The UPF may set up the control plane signaling connection with a SMF through a NG interface 4 (abbreviated as N4). The UPF may interact user plane data with a data network through a NG interface 6 (abbreviated as N6). The AMF may set up the control plane signaling connection with the SMF through a NG interface 11 (abbreviated as N11). The SMF may set up the control plane signaling connection with a PCF through a NG Interface 7 (abbreviated as N7).

FIG. 1 exemplarily illustrates one base station, one core network device and two terminal devices. Optionally, the wireless communication system 100 may include multiple base station devices and other numbers of the terminal devices may be included within the coverage of each base station, which is not limited in the embodiments of the present disclosure.

It should be noted that FIG. 1 only illustrates by way of example the system to which the present disclosure applies and of course the method shown in the embodiment of the present disclosure may also be applied to other systems. In addition, the terms "system" and "network" herein are often used interchangeably herein. In this disclosure, the term "and/or" is only to describe an association relationship between associated objects and represents that three kinds of relationships may exist. For example, A and/or B may represent three conditions: independent existence of A, existence of both A and B and independent existence of B. In addition, the character "/" in the present disclosure generally indicates that the associated objects before and after this character is in an "or" relationship. It should be understood that the reference to "indication" in the embodiments of the present disclosure may be a direct indication, may be an indirect indication, or may be indicative of an association. For example, A indicates B, which may mean that A directly indicates B, for example, B may be obtained through A; it may also mean that A indirectly indicates B, for example, A indicates C, and B may be obtained by C; and it may also indicate that there is an association between A and B. It should also be understood that the term "correspondence" may mean that there is a direct correspondence or an indirect correspondence between the two, may also mean that there is an association relationship between the two, and may also be a relationship between indication and being indicated, configuration and being configured, etc. It should also be understood that "predefined" or "predefined rules" may be achieved by pre-storing corresponding codes, tables or other means used for indicating relevant information in devices (e.g., including terminal devices and network devices), and the present disclosure is not limited to the specific implementation thereof. For example, predefined may refer to what is defined in the protocol. It should also be understood that, in the embodiments of the present disclosure, the "protocol" may be a standard protocol in the communication field. For example, the protocol may include an LTE protocol, an NR protocol, and related protocols applied in future communication systems, which are not limited in the present disclosure.

In order to facilitate understanding of the technical schemes of the embodiments of the present disclosure, the technical technology related to the embodiments of the present disclosure are described below, and the following related technologies, as optional schemes, can be arbitrarily combined with the technical schemes of the embodiments of the present disclosure, all of which belong to the protection scope of the embodiments of the present disclosure.

It is an important direction of the network development in the future that the (AI) technology empowers the control plane function or the user plane function. Therefore, it is necessary to use the corresponding AI model to achieve the purpose of empowering the specific functions. A Node (such as, a base station) may select a suitable AI model for a terminal to optimize functions.

Figure 2:
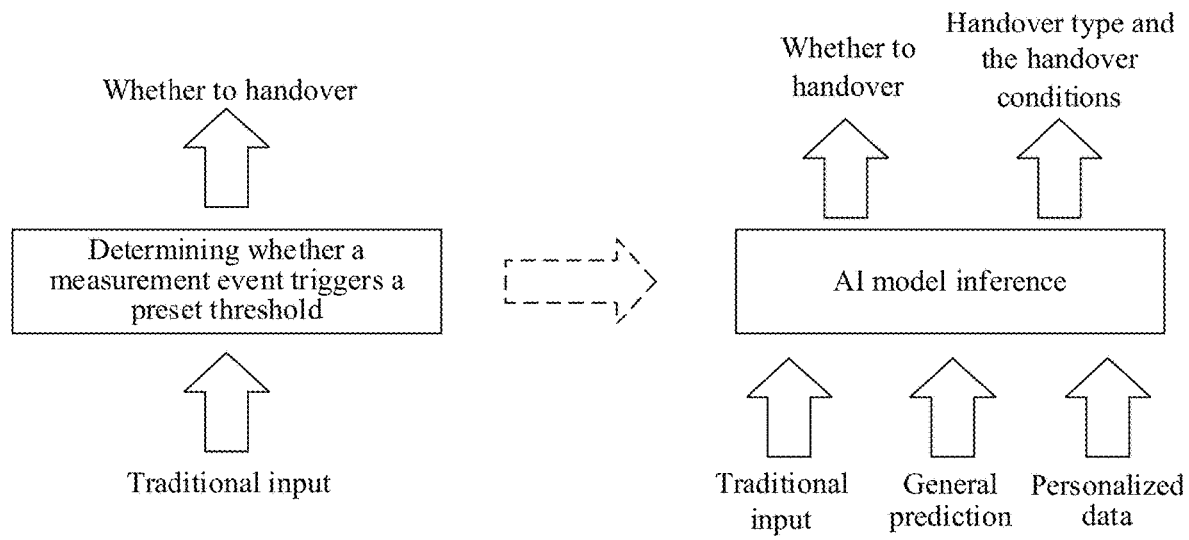
FIG. 2 is a schematic diagram of empowering a control plane function by using an AI model according to an embodiment of the present disclosure.

As an example, FIG. 2 illustrates empowering a control plane function by using an AI model. Herein, the control surface function of "handover" is taken as an example. The left part is a traditional handover, and the right part is the handover implemented based on an AI model. For the traditional handover, an input is a traditional input, i.e., a measurement value of Reference Signal Receiving Power (RSRP); it is determined whether a measurement event triggers a preset threshold based on the traditional input; and an output is a decision of whether to handover. For the handover implemented based on the AI model, an input includes a traditional input, a general prediction and personalized data (or dedicated data); inference is performed based on the input by using the AI model; and an output includes a decision of whether to handover, a handover type and the handover conditions.

Furthermore, for the handover implemented based on the AI model, the input includes three types of input parameters. Herein, the traditional input is for example the measurement value of the RSRP; the general prediction includes one or more of: a service prediction, a position prediction, a load prediction and a user behavior prediction; the personalized data includes: current speed of the terminal, upper limited delay, reliability requirements and the like. These three types of input parameters are taken as the input of the AI model together, and a personalized output is inferred through the AI model. Herein, the personalized output is the dedicated output of handover optimization function, and includes not only the decision of whether to handover, but also the decision information such as the handover type and the handover conditions. The handover type includes, for example, a traditional handover (HO), a NR Dual Active Protocol Stack (DAPS) handover, a Controlled HO (CHO), a Random Access Channel (RACH)-less handover, etc. The handover conditions include, for example, a target cell list, a time, a position, an upper limited time when the handover occurs, and the like. The rich personalized output may control the handover more flexibly, thus improving the success rate of handover and reducing the impact on service continuity.

In addition to empowering the handover by using the above method, other control plane functions may be empowered by using the above methods, for example, the AI empowering an access process, the AI empowering terminal energy saving, the AI empowering channel estimation and so on.

Figure 3:
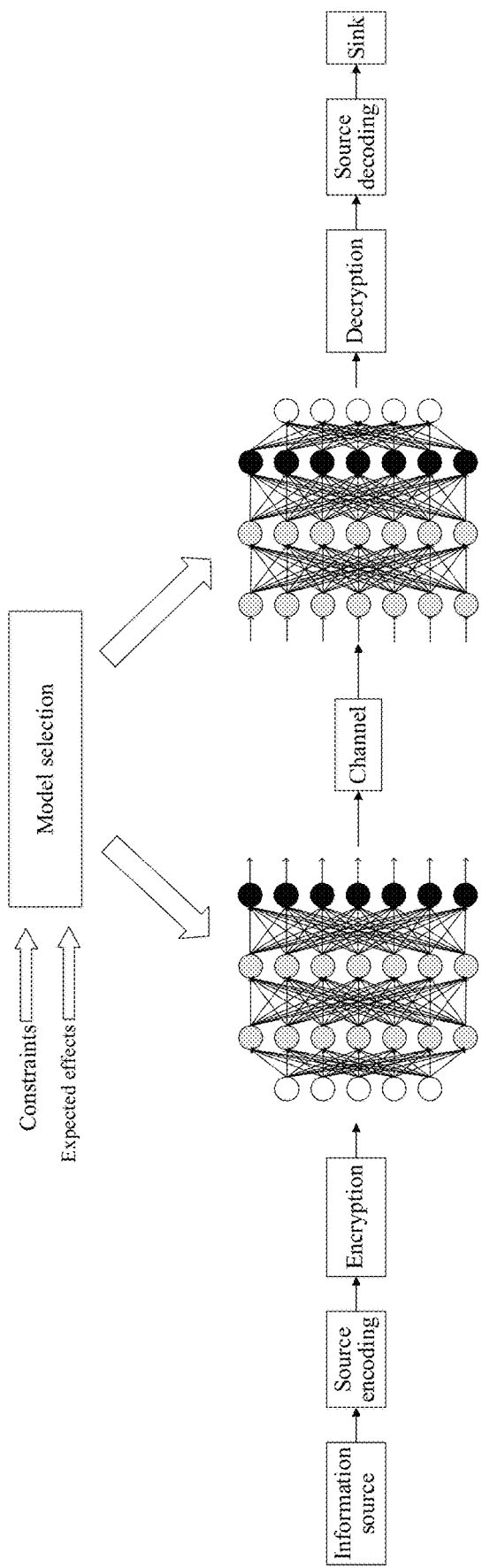
FIG. 3 is a schematic diagram of empowering a user plane function by using an AI model according to an embodiment of the present disclosure.

As an example, FIG. 3 illustrates empowering a user plane function by using an AI model. Herein, the user plane function of "channel encoding and decoding" is taken as an example. As shown in FIG. 3, for the channel encoding and decoding of a physical layer, an AI model inference is used for replacing the existing wireless channel encoding and decoding module, so as to acquire good gain and continuous self-evolution and self-optimization capabilities.

In a process of the AI empowerment, constraints and expected effects need to be defined according to requirements. As an example, the constraints include, but are not limited to, channel conditions, bandwidth limitations, delay sensitivity, unexpected errors, etc. The expected effects include, but are not limited to, transmission rate requirements, error rate requirements, reliability requirements, etc. These constraints and expected effects are used as the input of the AI model together, and the most suitable AI model is selected according to AI model inference for performing channel encoding and decoding, so as to achieve the optimal effect in specific environment and specific conditions and improve the performance of the whole communication system. The selected AI model replaces the existing channel encoding and decoding module to achieve the effect of the AI empowerment. Through the self-learning and self-optimization of the AI model, the AI model may adapt to the ever-changing constraints and ensure the expected effect, thereby achieving or even exceeding the gain brought by traditional channel coding to communication.

According to the above descriptions, the optimizations of different functions need to use corresponding AI models, and the AI models vary with many conditions (such as places, time, users, services, etc.). Therefore, different terminals under different conditions need to use different models. This will lead to the network architecture needing to support massive AI models and support the management of the massive AI models, so that nodes applying the AI models may store or update the AI models according to requirements, and acquire corresponding AI models for use according to requirements. In view of this, the following technical schemes of the embodiments of the present disclosure are proposed.

It should be noted that the technical schemes of the embodiments of the present disclosure may be applied to, but is not limited to, 5G networks. For example, the technical schemes may be applied to 6G networks, future networks, etc., which is not limited in the present disclosure.

It should be noted that although the above description is based on the AI model as an example, the technical schemes of the embodiments of the present disclosure is described based on the "model". The model in the technical schemes of the embodiments of the present disclosure may be a network model. The network model may be, but is not limited to, the AI model, for example, a Machine Learning (ML) model, which is not limited to the present disclosure. As examples, the network model may be a Deep Neural Network (DNN) model, a Recurrent Neural Network (RNN) model, a Convolution Neural Network (CNN) model, a Multilayer Perception (MPL) model, and the like.

In order to facilitate understanding of the technical schemes of the embodiments of the present disclosure, the technical schemes of the present disclosure will be described in detail below by way of specific embodiments. The above related technologies, as optional schemes, can be arbitrarily combined with the technical schemes of the embodiments of the present disclosure, all of which belong to the protection scope of the embodiments of the present disclosure. Embodiments of the present disclosure include at least part of the following content.

FIG. 4 is a first flowchart of a method for a model management according to an embodiment of the present disclosure. As shown in FIG. 4, the method for a model management includes operation 401.

In operation 401, a model management module provides a model management service for a node, and the node acquires the model management service provided by the model management module, where the model management service supports the node to perform at least one of: storing one or more models to the model management module; updating one or more models in the model management module; or acquiring one or more models from the model management module.

In the embodiment of the present disclosure, a new model is added into the mobile network, and referred as the model management module. Herein, the mobile network may be, but is not limited to, a 5G network. For example, the mobile network may be a 6G network, a future network, etc. The type of the mobile network is not limited in the present disclosure. In some optional implementations, the model management module may be located in the core network in the mobile network.

In some optional implementations, the model management module may be called as the MSF network element. Of course, the name of the model management module is not limited to the MSF network element, and the model management module may also be called as other names, which is not limited in the present disclosure.

In the embodiment of the present disclosure, the model management module is configured to store models. Generally, the model management module stores a large number of models. In other words, the model management module stores massive models. The node may acquire the model management service provided by the model management module. Herein, the model management service supports the node to perform at least one of: storing one or more models to the model management module; updating one or more models in the model management module; and acquiring one or more models from the model management module.

For example, for the operation that the node stores the one or more models to the model management module, specifically, the node may send a model storage message carrying the model information to be stored to the model management module, thereby implementing storing models to the model management module. Herein, the node may be understood as a model provider.

For example, for the operation that the node updates the one or more models in the model management module, specifically, the node may send a model update message carrying the model information to be updated to the model management module, thereby implementing updating the stored model in the model management module. Herein, the node may be understood as the model provider.

For example, for the operation that the node acquires the one or more models from the model management module, specifically, the node may send to the model management module a model request message carrying the model information that needs to be requested to acquire, thereby implementing acquiring the models from the model management module. Herein, the node may be understood as a model user or a model consumer.

In some optional implementations, a type of the node includes at least one of: a terminal, a base station, a core network element, or an application server. Herein, the core network element may be, for example, a Network Data Analysis Function (NWDAF), a User Plane Function (UPF), and the like.

It should be noted that the type of the node is not limited in the present disclosure, and any node that needs to acquire the model management service may adopt the technical schemes of the embodiments of the present disclosure.

In the embodiment of the present disclosure, each model has a corresponding model identifier (ID) for identifying the model.

In some optional implementations, the model identifier includes at least one of: service information, time information, version information, network information and position information.

Herein, the service information is used for determining a service adaptable to the model. The service adaptable to the model may also be understood as the function implemented by the model. The function implemented by the model may be a control plane function or a user plane function. As examples, the control plane function includes, for example, the handover, the access procedure, the terminal energy saving, the channel estimation, and the like. As examples, the user plane function includes, for example, the channel encoding and decoding, etc.

Herein, the time information is used for determining a time when the model is generated or a time when the model is updated.

Herein, the version information is used for determining a version corresponding to the model.

Herein, the network information is used for determining a network adaptable to the model. Specifically, the network information is used for determining which one or several networks are adaptable to the model and/or which one or several sub-networks of the network are adaptable to the model. Optionally, the network information includes a network identifier of at least one network and/or a network identifier of at least one sub-network. As an example, the network identifier may be, for example, a Public Land Mobile Network (PLMN) ID, the specific implementation of the network identifier is not limited herein.

Herein, the position information is used for determining an area adaptable to the model. Optionally, the position information includes at least one of: a TrackingArea (TA) list, a cell list, or indication information of a geographic position area.

In the embodiment of the present disclosure, one or more model management modules may exist in one network, and one model management module may correspond to one or more nodes. That is to say, the model management module is configured to provide the model management service for the one or more nodes.

Figure 5A:
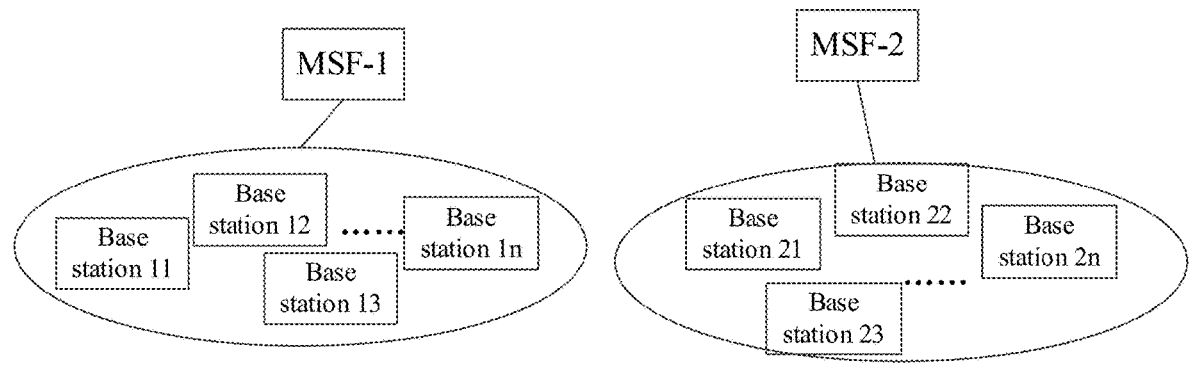
FIG. 5A is a schematic diagram of base stations serviced by different Model Storage Function (MSF) according to an embodiment of the present disclosure.

As an example, with reference to FIG. 5A, taking the model management module being called as the MSF and the node being a base station as an example, two MSFs exist in the network, namely the MSF-1 and the MSF-2. The MSF-1 corresponds to a group of base stations and is configured to provide the model management service for the group of the base stations. The MSF-2 corresponds to another group of base stations and is configured to provide the model management service for another group of the base stations.

Figure 5B:
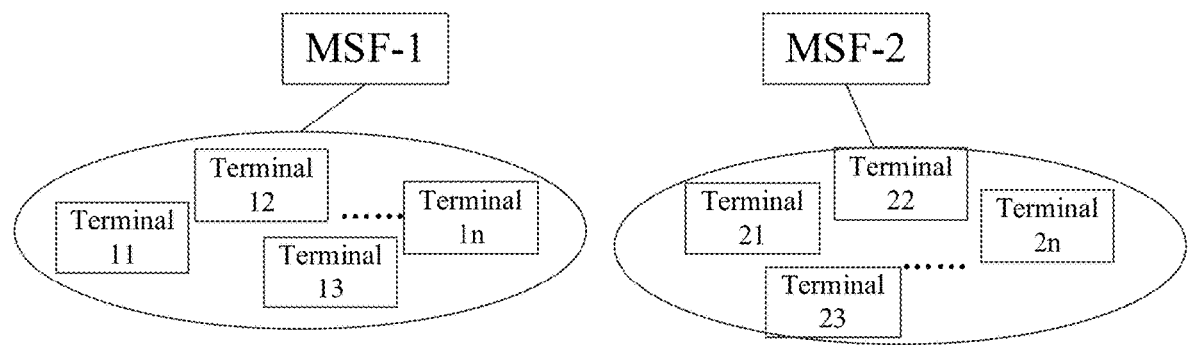
FIG. 5B is a schematic diagram of terminals serviced by different MSF according to an embodiment of the present disclosure.

As an example, with reference to FIG. 5B, taking the model management module being called as the MSF and the node being a terminal as an example, two MSFs exist in the network, namely the MSF-1 and the MSF-2. The MSF-1 corresponds to a group of terminals and is configured to provide the model management service for the group of the terminals. The MSF-2 corresponds to another group of terminals and is configured to provide the model management service for another group of the terminals.

In some optional implementations, in a case where the node is the base station, the base station sends one or more models obtained from the model management module to one or more terminals.

In some optional implementations, an identical terminal under different conditions uses different models; different terminals under a same condition use different models; or different terminals under different conditions use different models. Furthermore, optionally, the condition includes at least one of: a position, a time or a service.

Figure 6A:
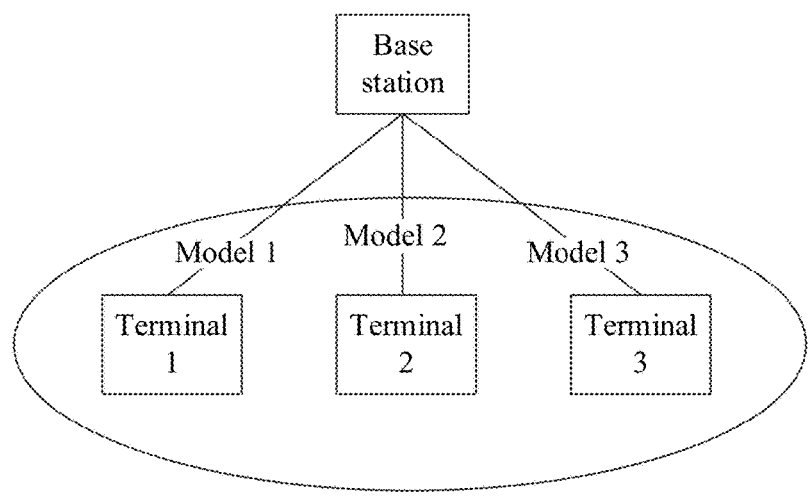
FIG. 6A is a schematic diagram of using different models according to an embodiment of the present disclosure.

In an example, with reference to FIG. 6A, different terminals within the coverage of the same base station use different models. For example, a terminal 1 uses a model 1, a terminal 2 uses a model 2, and a terminal 3 uses a model 3.

Figure 6B:
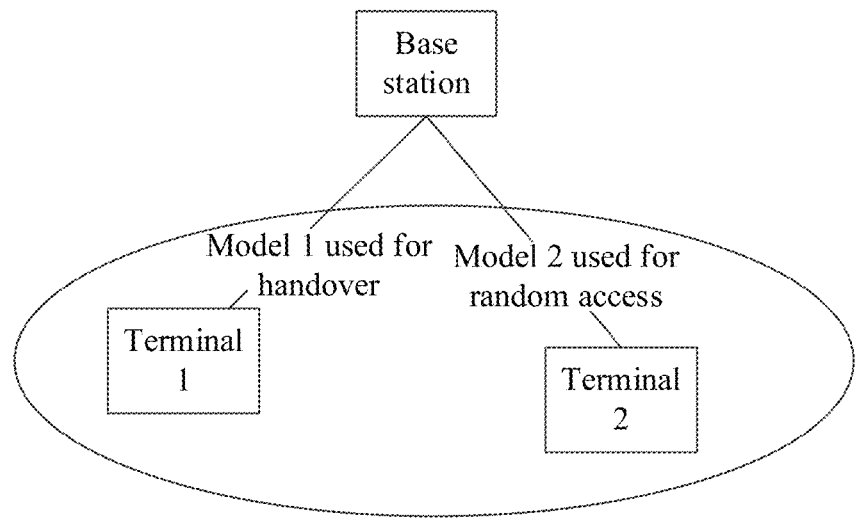
FIG. 6B is a second schematic diagram of using different models according to an embodiment of the present disclosure.

In an example, with reference to FIG. 6B, different services within the coverage of the same base station use different models. For example, the handover uses a model 1 and the random access uses a model 2.

Figure 6C:
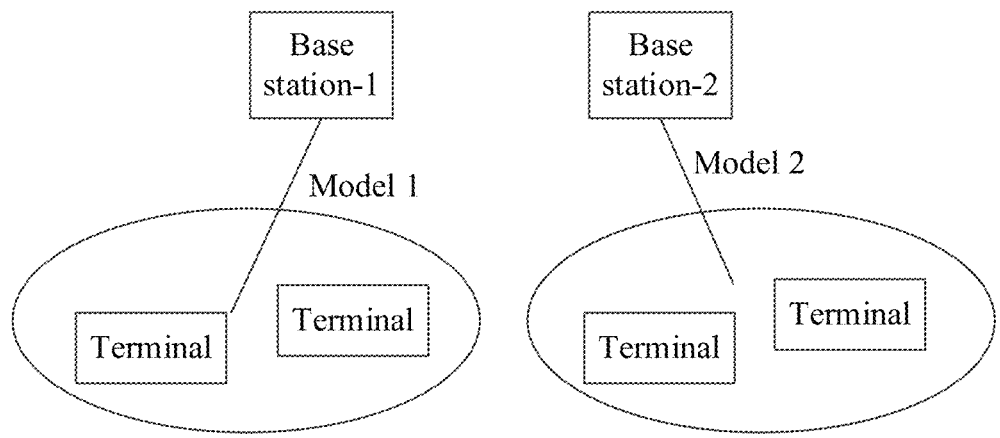
FIG. 6C is a third schematic diagram of using different models according to an embodiment of the present disclosure.

In an example, with reference to FIG. 6C, different models are used within the coverage of different base stations. For example, a model 1 is used within the coverage of a base station-1, and model 2 is used within the coverage of a base station-2.

Figure 6D:
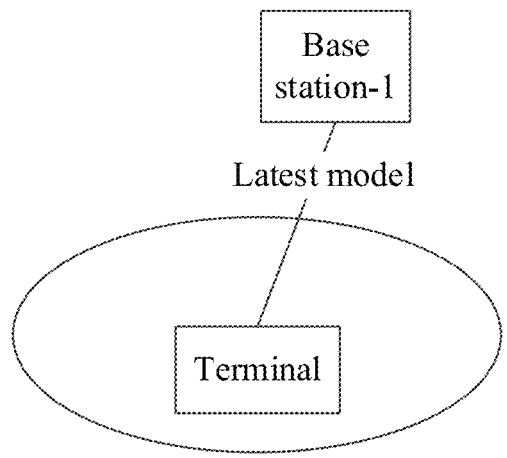
FIG. 6D is a fourth schematic diagram of using different models according to an embodiment of the present disclosure.

In an example, with reference to FIG. 6D, the same terminal within the coverage of the same base station uses different models over time.

In some optional implementations, the node may acquire the model management service provided by the model management module in the following manner. The node acquires address information of the model management module, and acquires the model management service from the model management module according to the address information. Optionally, the address information is a Uniform Resource Locator (URL) address or an Internet Protocol (IP) address.

In one case that the address information is the IP address, the node directly acquires the model management service from the model management module according to the IP address.

In another case that the address information is the URL address, the node determines an IP address according to the URL address, and acquires the model management service from the model management module according to the IP address. Herein, the node may, but is not limited to, acquire the IP address corresponding to the URL address through the DomainName System (DNS) resolution.

For example, taking the node being the base station as an example, a first base station stores a model to the model management module or updates a model in the model management module, and indicates the model management module that the model is available for other base stations to use. Other base stations may communicate with the model management module through the address information of the model management module to acquire the model, and then use the model.

According to the technical schemes of the embodiments of the present disclosure, the model management module is introduced to provide the model management service for the node through the model management module, and the node may acquire a model management service provided by the model management module according to requirements. Therefore, the effective management for the models can be implemented and the guarantee that the specific functions are empowered by using the models is provided.

Figure 7:
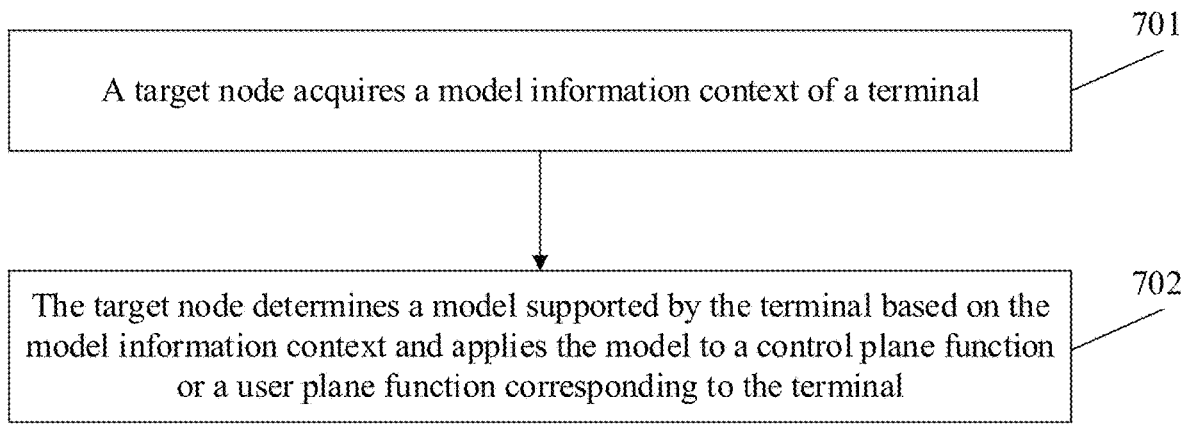
FIG. 7 is a second flowchart of a method for a model management according to an embodiment of the present disclosure.

FIG. 7 is a second flowchart of a method for a model management according to an embodiment of the present disclosure. As shown in FIG. 7, the method for a model management includes operations 701 to 702:

In operation 701, a target node acquires a model information context of a terminal.

In operation 702, the target node determines a model supported by the terminal based on the model information context and applies the model to a control plane function or a user plane function corresponding to the terminal.

In the embodiment of the present disclosure, an identical terminal under different conditions uses different models; different terminals under a same condition use different models; or different terminals under different conditions use different models. Herein, optionally, the condition includes at least one of: a position, a time and a service.

In view of the mobility of the terminal, the model-related context used by the terminal (called as the model information context for short) needs to be migrated together as the terminal moves to different nodes. In a case where the terminal moves to the target node, the model information context needs to be migrated to the target node. In other words, the target node needs to acquire the model information context of the terminal, so that the target node provides services for the terminal based on the model information context.

In some optional implementations, the model information context may be a part of a terminal context, or the model information context may be independent of the terminal context.

In some optional implementations, after the target node acquires the model information context of the terminal, the target node stores the model information context and/or maintains the model information context.

In some optional implementations, the target node is a target base station. After the target base station acquires the model information context of the terminal, the target base station may continue to use the model supported by the terminal for service according to the model information context.

As an example, the target base station may select an adaptable model (such as, a model supported by the terminal, specifically, a model used or configured for the terminal) according to the model information context and apply the selected model to the control plane function or the user plane function. For example, with reference to FIG. 2, the target base station may select a model applied to the handover according to the model information context. For example, with reference to FIG. 3, the target base station may select a model applied to the channel encoding and decoding according to the model information context. The control plane function or user plane function to which the model is applied is not limited in the present disclosure.

It should be noted that the target node is not limited to the target base station, but may also be other nodes, such as a target core network element. As an example, the target core network element may be a target access management function network element, such as, a target AMF.

As a case, in the handover preparation process, the model information context may also be used as a judgment factor for selecting the target node. For example, the source node or the core network element may select a base station supporting the model used by the terminal as the target base station to initiate the handover. After the handover is completed, the model information context continues to be stored in the target node and/or the model information context continues to be maintained in the target node.

In some optional implementations, the model information context includes at least one of following pieces of information:
  terminal identifier;
  model information stored by the terminal;
  model information supported by the terminal;
  model information with which the terminal is configured;
  model information used by the terminal;
  starting time of model usage;
  ending time of model usage;
  service information adaptable to the model; or
  condition information adaptable to the model.

In the above schemes, the model information includes at least one of: a model content, or a model identifier. In some optional implementations, the model identifier includes at least one of: service information, time information, version information, network information or position information.

Herein, the service information is used for determining a service adaptable to the model. The service adaptable to the model may also be understood as the function implemented by the model. The function implemented by the model may be a control plane function or a user plane function. As examples, the control plane function includes, for example, the handover, the access procedure, the terminal energy saving, the channel estimation, and the like. As examples, the user plane function includes, for example, the channel encoding and decoding, etc.

Herein, the time information is used for determining a time when the model is generated or a time when the model is updated.

Herein, the version information is used for determining a version corresponding to the model.

Herein, the network information is used for determining a network adaptable to the model. Specifically, the network information is used for determining which one or several networks are adaptable to the model and/or which one or several sub-networks of the network are adaptable to the model. Optionally, the network information includes a network identifier of at least one network and/or a network identifier of at least one sub-network. As an example, the network identifier may be, for example, a PLMN ID, the specific implementation of the network identifier is not limited herein.

Herein, the position information is used for determining an area adaptable to the model. Optionally, the position information includes at least one of: a TA list, a cell list, and indication information of a geographic position area.

In the above schemes, the condition information adaptable to the model includes at least one of: a position, a time or a service.

In the embodiment of the present disclosure, the model information context is stored in at least one of following types of nodes: a terminal, a base station, a core network element and a model management module. Herein, optionally, the core network element may be an access management function network element, such as, an AMF. The model information context may be migrated to the target node as the terminal moves.

In some optional implementation, the target node is a target base station to which the terminal moves from an original base station. The target base station acquires the model information context of the terminal from one of the original base station, the core network element or the model management module.

Furthermore, in a case where the target base station acquires the model information context of the terminal from the core network element, in response to the core network element changing from an original core network element to a target core network element, the model information context of the terminal is acquired by the target core network element from the original core network element, the target core network element being a core network element corresponding to the target base station. The original core network element is a core network element corresponding to the original base station. The target base station acquires from the target core network element the model information context which is from the original core network element.

In some optional implementations, the target node is a target core network element corresponding to a target base station, and the target base station is a base station to which the terminal moves from an original base station. The target core network element acquires the model information context of the terminal from an original core network element or the model management module. The original core network element is a core network element corresponding to the original base station.

Several scenarios are provided to illustrate how the model information context is migrated to the target node.

First Scenario

Figure 8A:
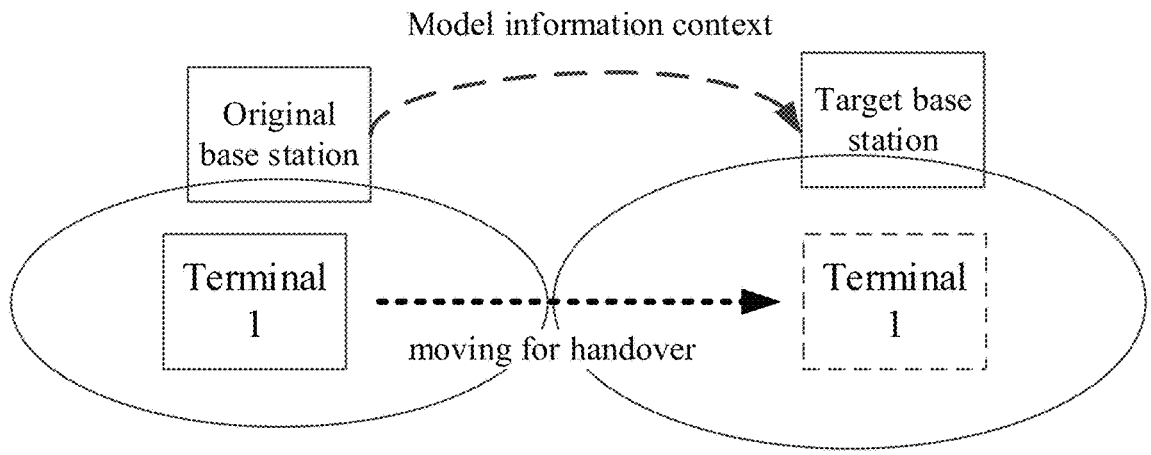
FIG. 8A is a first schematic diagram of a migration of a model information context according to an embodiment of the present disclosure.

With reference to FIG. 8A, when a terminal 1 is in a connected state, and performs a handover from an original base station to a target base station, the target base station acquires a model information context from the original base station. Optionally, the model information context may be a part of the terminal context. Herein, the target base station may acquire the model information context from the original base station through a direct connection interface between the base stations or indirectly acquire the model information context which is from the original base station through the interface with the core network element.

Second Scenario

Figure 8B:
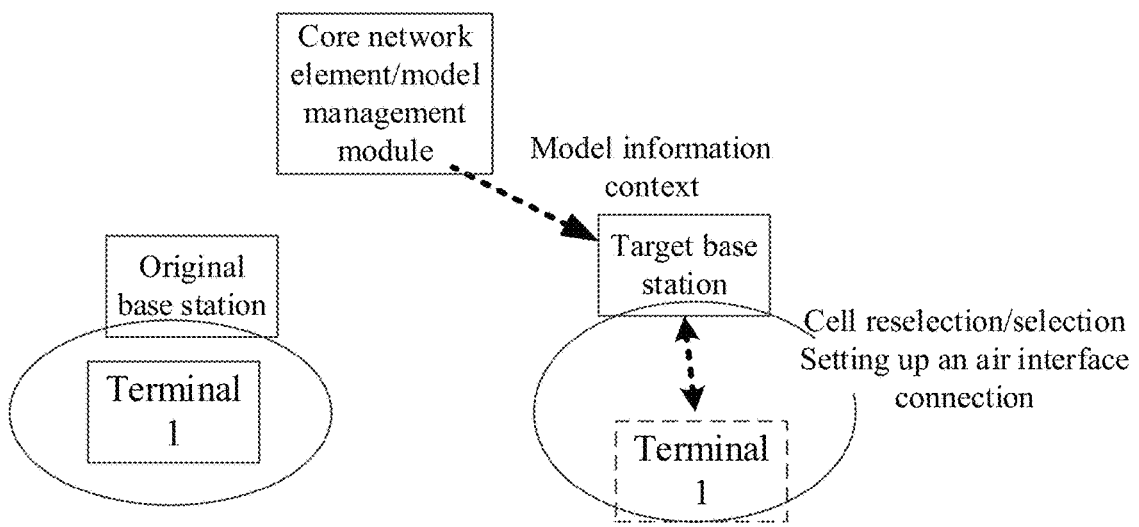
FIG. 8B is a second schematic diagram of a migration of a model information context according to an embodiment of the present disclosure.

With reference to FIG. 8B, when a terminal 1 is in an idle state or an inactive state, and moves from an original base station to a target base station, the target base station acquires a model information context from a core network element or a model management module. Optionally, the model information context may be a part of a terminal context. Herein, the core network element is, for example, the AMF.

Figure 8C:
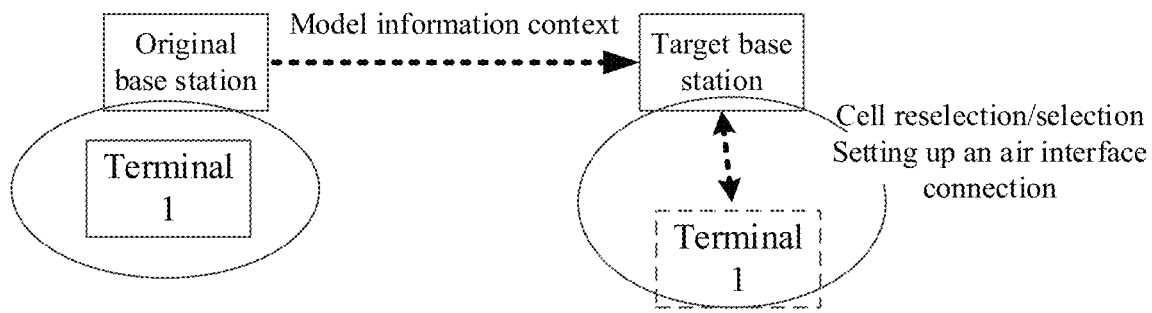
FIG. 8C is a third schematic diagram of a migration of a model information context according to an embodiment of the present disclosure.

With reference to FIG. 8C, when the terminal 1 is in the idle state or the inactive state, and moves from the original base station to the target base station, the target base station acquires a model information context from the original base station. Optionally, the model information context may be a part of the terminal context.

Third Scenario

Figure 8D:
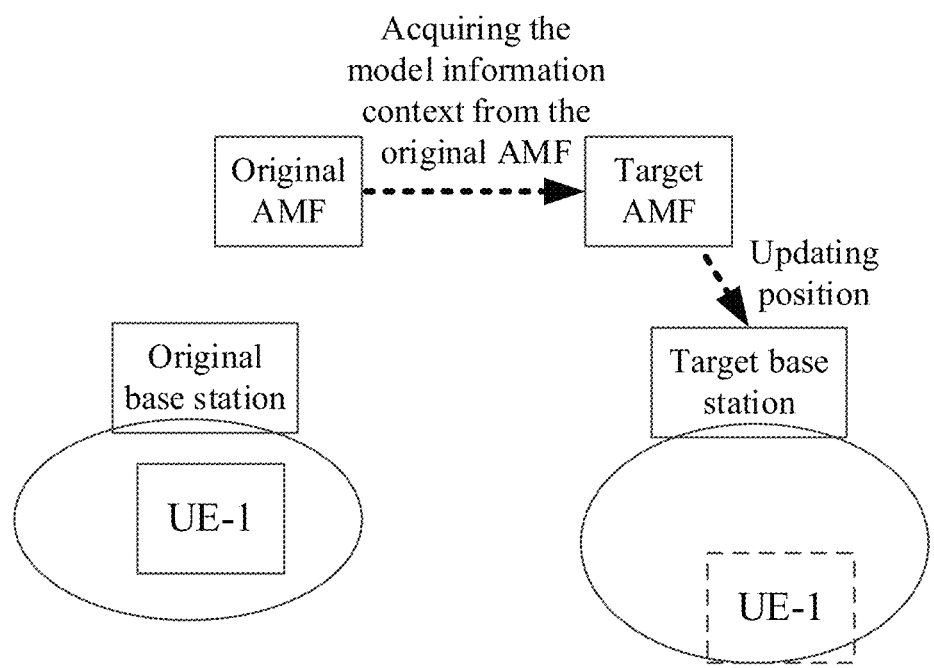
FIG. 8D is a fourth schematic diagram of a migration of a model information context according to an embodiment of the present disclosure.

With reference to FIG. 8D, taking the core network element being an AMF as an example, when a terminal 1 performs a position update at the target base station, the AMF changes, and the target AMF acquires the model information context from the original AMF and further sends the model information context to the target base station. Optionally, the model information context may be a part of the terminal context.

Preferred embodiments of the present disclosure have been described in detail with reference to the accompanying drawings, but the present disclosure is not limited to the specific details of the above implementations. Within the scope of the technical conception of the present disclosure, various simple modifications may be made to the technical scheme of the present disclosure, and these simple modifications all fall within the scope of protection of the present disclosure. For example, each of the specific technical features described in the above specific implementations may be combined in any suitable manner without contradiction, and various possible combinations are not further described in this disclosure in order to avoid unnecessary repetition. For another example, any combination may be made between the various implementations of the present disclosure so long as it does not depart from the idea of the present disclosure and is also to be regarded as the contents disclosed by the present disclosure. For another example, on the premise of no conflict, each embodiment described in the present disclosure and/or the technical features in each embodiment may be arbitrarily combined with the prior art, and the technical scheme obtained after the combination should also fall within the scope of protection of the present disclosure.

It should be understood that, in various embodiments of the present disclosure, the sequence numbers of the above processes do not imply the sequence of execution, and the sequence of execution of each process should be determined according to its functions and internal logic, and should not constitute any limitation on the implementation process of the embodiments of the present disclosure. Furthermore, in embodiments of the present disclosure, the terms "downlink", "uplink" and "sidelink" are used to represent the transmission direction of the signal or data, where the term "downlink" is used to represent a transmission direction of the signal or data as a first direction transmitted from a site to the user equipment of the cell, the term "uplink" is used to represent a transmission direction of the signal or data as a second direction transmitted from the user equipment of the cell to the site, and the term "sidelink" is used to represent a transmission direction of the signal or data as a third direction transmitted from the user equipment 1 to the user equipment 2. For example, a term "downlink signal" means that the transmission direction of the signal is a first direction. In addition, in embodiments of the present disclosure, the term "and/or" is only an association relationship describing associated objects and represents that three relationships may exist. For example, A and/or B may represent three conditions: i.e., independent existence of A, existence of both A and B and independent existence of B. In addition, the character "/" in the present disclosure generally indicates that the relationship between the associated objects is "or".

Figure 9:
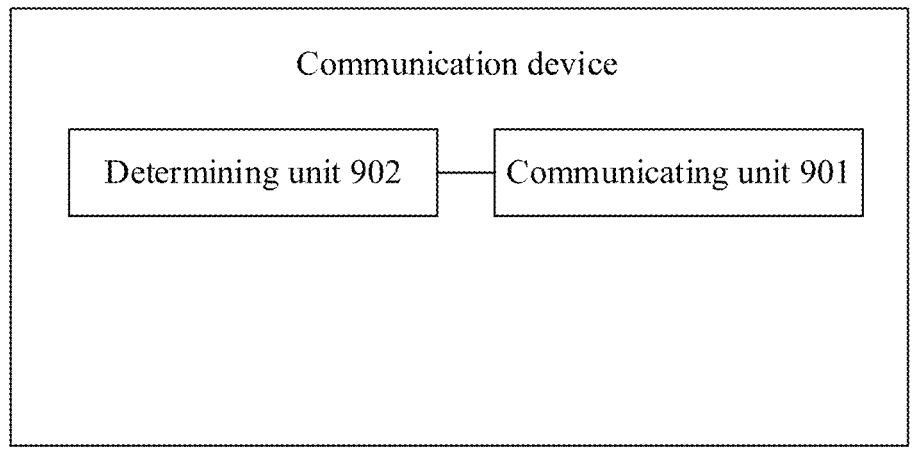
FIG. 9 is a first schematic structural diagram of a communication device according to an embodiment of the present disclosure.

FIG. 9 is a first schematic structural diagram of a communication device according to an embodiment of the present disclosure. As shown in FIG. 9, the communication device includes a communicating unit 901.

The communicating unit 901 is configured to acquire a model management service provided by a model management module. The model management service supports the communication device to perform at least one of following operations:
  storing one or more models to the model management module;
  updating one or more models in the model management module; or
  acquiring one or more models from the model management module.

In some optional implementations, each of the one or more models has a corresponding model identifier for identifying the model.

In some optional implementations, the model identifier includes at least one of following information:
  service information, time information, version information, network information or position information.

In some optional implementations, the service information is used for determining a service adaptable to the model.

In some optional implementations, the time information is used for determining a time when the model is generated or a time when the model is updated.

In some optional implementations, the version information is used for determining a version corresponding to the model.

In some optional implementations, the network information is used for determining a network adaptable to the model.

In some optional implementations, the position information is used for determining an area adaptable to the model.

In some optional implementations, a type of the communication device includes at least one of: a terminal, a base station, or a core network element.

In some optional implementations, one model management module corresponds to one or more communication devices, and the model management module is configured to provide the model management service for the one or more communication devices.

In some optional implementations, the communicating unit 901 is configured to acquire address information of the model management module and acquire the model management service from the model management module according to the address information.

In some optional implementations, the address information is a URL address or an IP address.

In some optional implementations, in a case where the address information is the URL address,
  the communication device further includes a determining unit 902 configured to determine an IP address according to the URL address; and
  the communicating unit 901 is configured to acquire the model management service from the model management module according to the IP address.

In some optional implementations, in a case where the communication device is a base station, the communicating unit 901 is further configured to send one or more models acquired from the model management module to one or more terminals.

In some optional implementations, an identical terminal under different conditions uses different models; or different terminals under a same condition use different models; or different terminals under different conditions use different models.

In some optional implementations, the condition includes at least one of: a position, a time and a service.

In some optional implementations, the model management module is located in a core network.

Those skilled in the art will appreciate that the above related description of the communication device of the embodiments of the present disclosure may be understood with reference to the related description of the method for a model management of the embodiments of the present disclosure.

Figure 10:
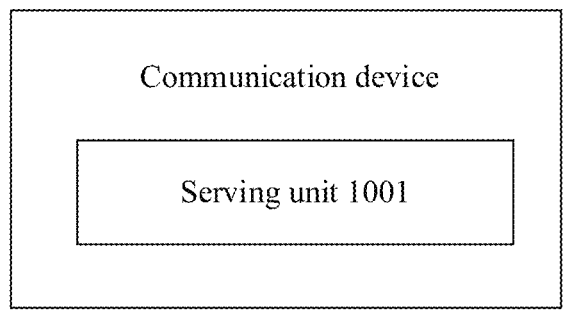
FIG. 10 is a second schematic structural diagram of a communication device according to an embodiment of the present disclosure.

FIG. 10 is a second schematic structural diagram of a communication device according to an embodiment of the present disclosure. As shown in FIG. 10, the communication device includes a serving unit 1001.

The serving unit 1001 is configured to provide a model management service for a node. The model management service supports the node to perform at least one of following operations:

storing one or more models to the model management module;

updating one or more models in the model management module; or acquiring one or more models from the model management module.

In some optional implementations, each of the one or more models corresponds to a model identifier for identifying the model.

In some optional implementations, the model identifier includes at least one of following information:

service information, time information, version information, network information or position information.

In some optional implementations, the service information is used for determining a service adaptable to the model.

In some optional implementations, the time information is used for determining a time when the model is generated or a time when the model is updated.

In some optional implementations, the version information is used for determining a version corresponding to the model.

In some optional implementations, the network information is used for determining a network adaptable to the model.

In some optional implementations, the position information is used for determining an area adaptable to the model.

In some optional implementations, a type of the node includes at least one of: a terminal, a base station, or a core network element.

In some optional implementations, the serving unit 1001 is configured to provide the model management service for one or more nodes.

In some optional implementations, the communication device is a model management module. Furthermore, in some optional implementations, the model management module is located in a core network.

Those skilled in the art will appreciate that the above-related description of the communication device of the embodiments of the present disclosure may be understood with reference to the related description of the method for a model management of the embodiments of the present disclosure.

Figure 11:
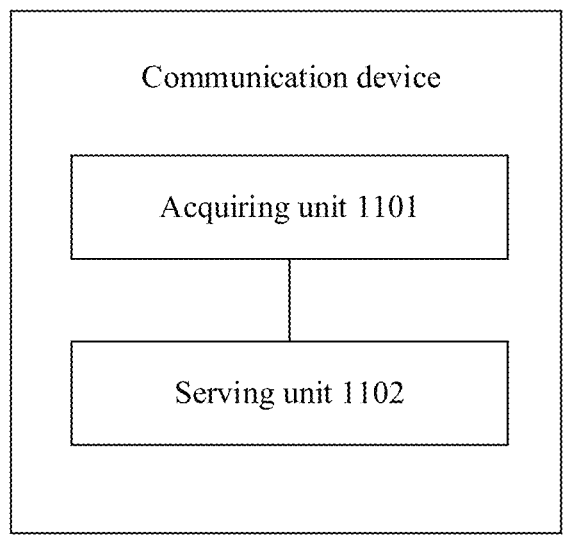
FIG. 11 is a third schematic structural diagram of a communication device according to an embodiment of the present disclosure.

FIG. 11 is a third schematic structural diagram of a communication device according to an embodiment of the present disclosure. As shown in FIG. 11, the communication device includes an acquiring unit 1101 and a serving unit 1102.

The acquiring unit 1101 is configured to acquire a model information context of a terminal.

The serving unit 1102 is configured to determine a model supported by the terminal based on the model information context; and apply the model to a control plane function or a user plane function corresponding to the terminal.

In some optional implementations, the communication device further includes a processing unit configured to store the model information context and/or maintain the model information context.

In some optional implementations, the model information context includes at least one of following information:

terminal identifier;

model information stored by the terminal;

model information supported by the terminal;

model information with which the terminal is configured;

model information used by the terminal;

starting time of model usage;

ending time of model usage;

service information adaptable to the model; or condition information adaptable to the model.

In some optional implementations, the model information includes a model content and/or a model identifier.

In some optional implementations, the model identifier includes at least one of following information:

service information, time information, version information, network information or position information.

In some optional implementations, the service information is used for determining a service adaptable to the model.

In some optional implementations, the time information is used for determining a time when the model is generated or a time when the model is updated.

In some optional implementations, the version information is used for determining a version corresponding to the model.

In some optional implementations, the network information is used for determining a network adaptable to the model.

In some optional implementations, the position information is used for determining an area adaptable to the model.

In some optional implementations, the model information context is stored in at least one of following types of nodes:

a terminal, a base station, a core network element or a model management module.

In some optional implementations, the communication device is a target base station to which the terminal moves from an original base station.

The acquiring unit 1101 is configured to acquire the model information context of the terminal from one of the original base station, the core network element or the model management module.

In some optional implementations, in a case where the acquiring unit 1101 acquires the model information context of the terminal from the core network element, in response to the core network element changing from an original core network element to a target core network element, the model information context of the terminal is acquired by the target core network element from the original core network element, the target core network element being a core network element corresponding to the target base station, and the original core network element being a core network element corresponding to the original base station The acquiring unit 1101 is configured to acquiring from the target core network element the model information context which is from the original core network element.

In some optional implementations, the communication device is a target core network element corresponding to a target base station, and the target base station is a base station to which the terminal moves from an original base station.

The acquiring unit 1101 is configured to acquire the model information context of the terminal from an original core network element or the model management module, where the original core network element is a core network element corresponding to the original base station.

Those skilled in the art will appreciate that the above-related description of the communication device of the embodiments of the present disclosure may be understood with reference to the related description of the method for a model management of the embodiments of the present disclosure.

Figure 12:
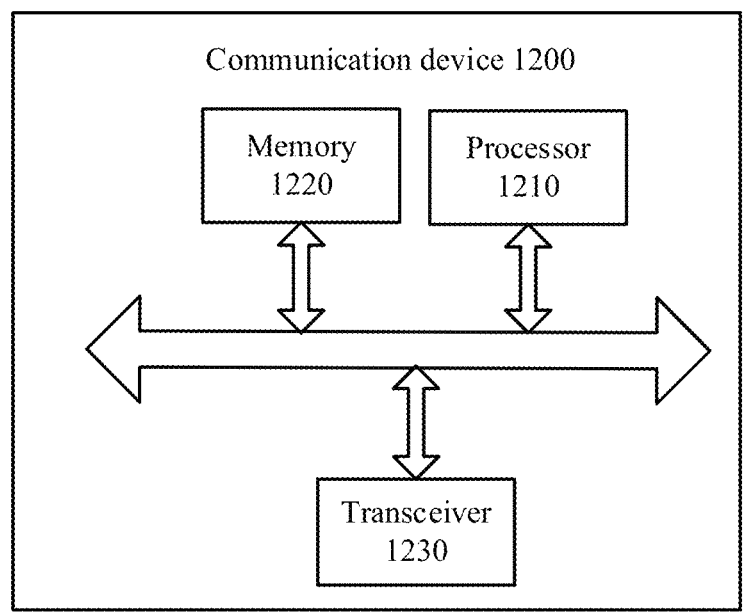
FIG. 12 is a fourth schematic structural diagram of a communication device according to an embodiment of the present disclosure.

FIG. 12 is a schematic structural diagram of a communication device 1200 according to an embodiment of the present disclosure. The communication device may be the node, the target node or the model management module in the above schemes. The communication device 1200 shown in FIG. 12 includes a processor 1210. The processor 1210 is configured to invoke and run the computer program stored in the memory to implement the methods in the embodiments of the present disclosure.

Optionally, as shown in FIG. 12, the communication device 1200 may also include a memory 1220. The processor 1210 may invoke and run a computer program from the memory 1220 to implement the methods in the embodiments of the present disclosure.

The memory 1220 may be a separate device independent of the processor 1210 or may be integrated in the processor 1210.

Optionally, as shown in FIG. 12, the communication device 1200 may also include a transceiver 1230. The processor 1210 may control the transceiver 1230 to communicate with other devices, in particular, to send information or data to other devices, or receive information or data from other devices.

The transceiver 1230 may include a transmitter and a receiver. The transceiver 1230 may further include an antenna(s), the number of antennas may be one or more.

Optionally, the communication device 1200 may be specifically the node of the embodiments of the present disclosure, and the communication device 1200 may implement the corresponding process implemented by the node in the various methods of the embodiments of the present disclosure. For the sake of simplicity, it will not be elaborated herein.

Optionally, the communication device 1200 may be a target node according to the embodiments of the present disclosure, and the communication device 1200 may implement the corresponding process implemented by the target node in the various methods of the embodiments of the present disclosure. For the sake of brevity, it will not be described herein.

Figure 13:
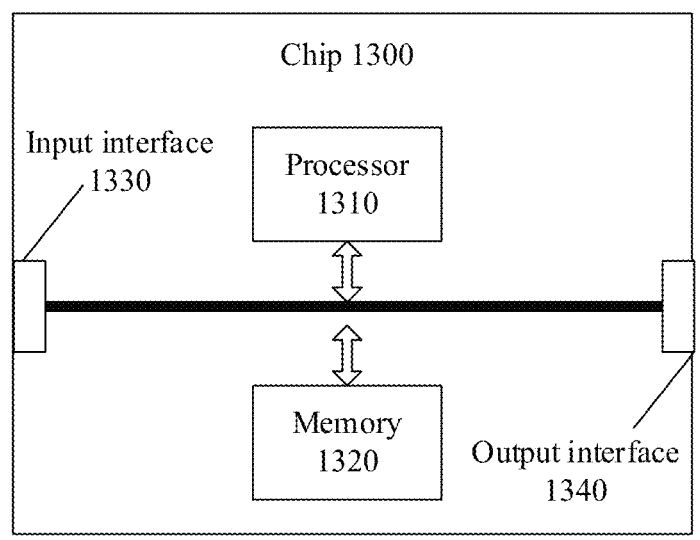
FIG. 13 is a schematic structural diagram of a chip according to an embodiment of the present disclosure.

FIG. 13 is a schematic structural diagram of a chip according to an embodiment of the present disclosure. The chip 1300 shown in FIG. 13 includes a processor 1310 configured to invoke and run a computer program from a memory, to implement the methods in the embodiments of the present disclosure.

Optionally, as shown in FIG. 13, the chip 1300 may also include a memory 1320. The processor 1310 may invoke and run a computer program from a memory 1320 to implement the methods in the embodiments of the present disclosure.

The memory 1320 may be a separate device independent of the processor 1310 or may be integrated in the processor 1310.

Optionally, the chip 1300 may also include an input interface 1330. The processor 1310 may control the input interface 1330 to communicate with other devices or chips, and in particular may obtain information or data sent by other devices or chips.

Optionally, the chip 1300 may also include an output interface 1340. The processor 1310 may control the output interface 1340 to communicate with other devices or chips, and in particular may output information or data to other devices or chips.

Optionally, the chip may be applied to the node in the embodiments of the present disclosure, and the chip may implement the corresponding process implemented by the node in various methods of the embodiments of the disclosure. For the sake of brevity, it will not be elaborated herein.

Optionally, the chip may be applied to the target node in the embodiments of the present disclosure, and the chip may implement the corresponding process implemented by the target node in various methods of the embodiments of the disclosure.

For the sake of simplicity, it will not be described herein.

It is to be understood that the chips mentioned in the embodiments of the present disclosure can also be referred to as system level chips, system chips, chip systems or on-chip system chips, etc.

Figure 14:
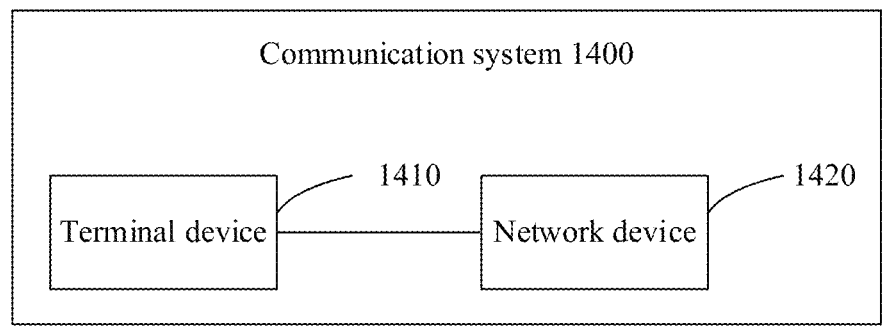
FIG. 14 is a schematic block diagram of a communication system according to an embodiment of the present disclosure.

FIG. 14 is a schematic block diagram of a communication system 1400 according to an embodiment of the present disclosure. As shown in FIG. 14, the communication system 1400 includes a terminal device 1410 and a network device 1420.

The terminal device 1410 may be configured to implement the corresponding functions implemented by the terminal device in the above methods, and the network device 1420 may be configured to implement the corresponding functions implemented by the network device in the above methods. For the sake of simplicity, it will not be elaborated herein.

It is to be understood that the processor of the embodiments of the present disclosure may be an integrated circuit chip with signal processing capability. In the implementation process, each operation of the above embodiments of the methods may be completed by the instruction in the form of integrated logic circuit of hardware or software in the processor. The above processor can be General Purpose Processor, Digital Signal Processor (DSP), Application Specific Integrated Circuit (ASIC), Field Programmable Gate Array (FPGA) or other programmable logic device, discrete gate or transistor logic device, and discrete hardware component. The disclosed methods, steps and logic block diagrams in the embodiments of the present disclosure can be implemented or executed. The general-purpose processor may be a microprocessor or any conventional processor or the like. The operations of the methods disclosed in connection with the embodiments of the present disclosure can be directly embodied in the execution completion of the hardware decoding processor, or by the combination of the hardware and software modules in the decoding processor. The software module can be located in random memory, flash memory, read-only memory, programmable read-only memory or electrically erasable programmable memory, register and other mature storage media in the art. The storage medium is located in the memory, and the processor reads the information in the memory and completes the steps of the above method in combination with its hardware.

It is to be understood that the memory in the embodiments of the present disclosure may be volatile memory or non-volatile memory, or may include both volatile and non-volatile memory. The non-volatile memory may be Read-Only Memory (ROM), Programmable ROM (PROM), Erasable PROM (EPROM), Electrically EPROM (EEPROM) or flash memory. Volatile memory may be Random Access Memory (RAM), which is used as an external cache. Many forms of RAM are available, such as Static RAM (SRAM), Dynamic RAM (DRAM), Synchronous DRAM (SDRAM), Double Data Rate SDRAM (DDR SDRAM, Enhanced SDRAM (ESDRAM), Synch link DRAM (SL-DRAM) and Direct Rambus RAM (DR RAM). It is to be noted that the memory of the systems and methods described herein is intended to include, but is not limited to, these and any other suitable types of memory.

It is to be understood that the above described memory is exemplary but not restrictive. For example, the memory in the embodiment of the present disclosure can also be Static RAM (SRAM), Dynamic RAM (DRAM), Synchronous DRAM (SDRAM), Double Data Rate SDRAM (DDR SDRAM), Enhanced SDRAM (ESDRAM), Synch Link DRAM (SLDRAM), Direct Rambus RAM (DR RAM), etc. That is to say, the memory in the embodiments of the present disclosure is intended to include, but not limited to, these and any other suitable types of memory.

The embodiments of the present disclosure also provide a computer-readable storage medium for storing computer programs.

Optionally, the computer-readable storage medium can be applied to the network device in the embodiments of the present disclosure, and the computer program enables the computer to execute the corresponding processes implemented by the network device in the various methods of the embodiments of the present disclosure. For the sake of brevity, it will not be repeated here.

Optionally, the computer-readable storage medium may be applied to the mobile terminal/terminal device in the embodiments of the present disclosure, and the computer program enables the computer to execute the corresponding processes implemented by the mobile terminal/terminal device in the various methods of the embodiments of the present disclosure. For the sake of brevity, it will not be repeated here.

The embodiment of the present disclosure also provides a computer program product, including computer program instructions.

Optionally, the computer program product may be applied to the network device in the embodiments of the present disclosure, and the computer program instructions enable the computer to execute the corresponding processes implemented by the network device in the various methods of the embodiments of the present disclosure.

For the sake of brevity, it will not be repeated here.

Optionally, the computer program product can be applied to the mobile terminal/terminal device in the embodiments of the present disclosure, and the computer program instructions enable the computer to execute the corresponding process implemented by the mobile terminal/terminal device in the various methods of the embodiments of the present disclosure, for the sake of brevity, it will not be repeated here.

The embodiment of the present disclosure also provides a computer program.

Optionally, the computer program may be applied to the network device in the embodiments of the present disclosure. When the computer program runs on the computer, the computer executes the corresponding process implemented by the network device in various methods of the embodiments of the present disclosure. For the sake of brevity, it will not be described herein.

Optionally, the computer program can be applied to the mobile terminal/terminal device in the embodiments of the present disclosure. When the computer program runs on the computer, the computer executes the corresponding process implemented by the mobile terminal/terminal device in the various methods of the embodiments of the present disclosure. For the sake of brevity, it will not be elaborated herein.

Those of ordinary skill in the art may realize that the unit and algorithm steps of each example described in combination with the disclosed embodiments herein can be realized by the electronic hardware, or the combination of computer software and electronic hardware. Whether these functions are performed in hardware or software depends on the specific application and design constraints of the technical schemes. A professional technician may use different methods to implement the described functions for each specific application, but such implementation shall not be considered beyond the scope of the present disclosure.

Those skilled in the art can clearly understand that for the convenience and simplicity of the description, the specific working process of the system, device and unit described above can refer to the corresponding process in the embodiments of the methods described above, and will not be described herein.

In several embodiments provided by the present disclosure, it should be understood that the disclosed systems, devices and methods can be realized in other ways. For example, the embodiment of the device described above is only schematic. For example, the division of the unit is only a logical function division, and there can be another division manner in actual implementation, for example, multiple units or components can be combined or integrated into another system, or some features can be ignored or not implemented. On the other hand, the mutual coupling or direct coupling or communication connection illustrated or discussed can be indirect coupling or communication connection through some interfaces, devices or units, and can be electric, mechanical or other forms.

The unit described as a separation part may or may not be physically separated, and the part displayed as a unit may or may not be a physical unit, that is, it may be located in one place, or it may be distributed to multiple network units. Some or all of the units can be selected according to the actual needs to achieve the purpose of the embodiment.

In addition, each functional unit in each embodiment of the present disclosure may be integrated in one processing unit, each unit may exist physically alone, or two or more units may be integrated in one unit.

If the function is realized in the form of a software function unit and sold or used as an independent product, it can be stored in a computer readable storage medium. Based on such understanding, the technical solution of the present disclosure in essence or part of making contribution to the related art, or part of the technical solution can be embodied in the form of a software product, the computer software product is stored in a storage medium and includes several instructions for making a computer device (which can be a personal computer, a server, a network device, etc.) to perform all or part of the steps of the method according to each embodiment of the present disclosure. The aforementioned storage media include: U disk, mobile hard disk, Read-Only Memory (ROM), Random Access Memory (RAM), disk or optical disk and other media that can store program code.

The above is only the specific implementations of the disclosure, but the scope of protection of the disclosure is not limited to this. Any person skilled in the technical field who can easily think of change or replacement within the technical scope of the disclosure shall be covered in the scope of protection of the disclosure. Therefore, the protection scope of the disclosure shall be subject to the protection scope of the claims.

What is claimed is:

1. A communication device, comprising:
 a processor, configured to acquire a model management service provided by a model management module, wherein the model management service supports the communication device to perform at least one of:
 storing one or more models to the model management module;
 updating one or more models in the model management module; or
 acquiring one or more models from the model management module;
 wherein the processor is further configured to: acquire address information of the model management module, and acquire the model management service from the model management module according to the address information;
 wherein in a case where the address information is a Uniform Resource Locator (URL) address,
 the processor is further configured to: determine an Internet Protocol (IP) address according to the URL address; and
 acquire the model management service from the model management module according to the IP address;
 wherein in a case where the communication device is a base station, the communication device further comprises a transceiver, the transceiver is configured to send one or more models acquired from the model management module to one or more terminals; and
 wherein different models are used for different terminals or different services within coverage of an identical base station; different models are used within coverage of different base stations; and an identical terminal within the coverage of the identical base station uses different models over time.

2. The communication device of claim 1, wherein each of the one or more models corresponds to a model identifier for identifying the model.

3. The communication device of claim 2, wherein the model identifier comprises at least one of:
 service information, wherein the service information is used for determining a service adaptable to the model;
 time information, wherein the time information is used for determining a time when the model is generated or a time when the model is updated;
 version information, wherein the version information is used for determining a version corresponding to the model;
 network information, wherein the network information is used for determining a network adaptable to the model; or
 position information, wherein the position information is used for determining an area adaptable to the model.

4. The communication device of claim 1, wherein a type of the communication device further comprises at least one of: a terminal, or a core network element.

5. A communication device, applied to a model management module, comprising:
 a processor, configured to provide a model management service for a node, wherein the model management service supports the node to perform at least one of:
 storing one or more models to the model management module;
 updating one or more models in the model management module; or
 acquiring one or more models from the model management module;
 wherein the model management service from the model management module is provided to the node according to address information of the model management module;
 wherein in a case where the address information is a Uniform Resource Locator (URL) address, an Internet Protocol (IP) address of the model management module is determined according to the URL address, and the model management service from the model management module is provided to the node according to the IP address;
 wherein in a case where the node is a base station, the processor is further configured to provide one or more models to the base station, and the one or more models are sent by the base station to the one or more terminals; and
 wherein different models are used for different terminals or different services within coverage of an identical base station; different models are used within coverage of different base stations; and an identical terminal within the coverage of the identical base station uses different models over time.

6. The communication device of claim 5, wherein each of the one or more models corresponds to a model identifier for identifying the model.

7. The communication device of claim 6, wherein the model identifier comprises at least one of:
 service information, time information, version information, network information or position information.

* * * * *